(12) United States Patent
Mohr

(10) Patent No.: US 9,903,076 B2
(45) Date of Patent: Feb. 27, 2018

(54) PAVER EXTENSION BRACKET DEVICE

(71) Applicant: Dan Mohr, Mitchell, SD (US)

(72) Inventor: Dan Mohr, Mitchell, SD (US)

( * ) Notice: Subject to any disclaimer, the term of this patent is extended or adjusted under 35 U.S.C. 154(b) by 14 days.

(21) Appl. No.: 15/099,211

(22) Filed: Apr. 14, 2016

(65) Prior Publication Data

US 2017/0298578 A1    Oct. 19, 2017

(51) Int. Cl.
*E01C 19/00*        (2006.01)
*E01C 19/22*        (2006.01)
*F16M 13/02*        (2006.01)

(52) U.S. Cl.
CPC .............. *E01C 19/22* (2013.01); *F16M 13/02* (2013.01); *E01C 2301/16* (2013.01)

(58) Field of Classification Search
None
See application file for complete search history.

(56) References Cited

U.S. PATENT DOCUMENTS

| | | | |
|---|---|---|---|
| 3,557,672 A * | 1/1971 | Shurtz ................. | E01C 19/4873 404/118 |
| 3,992,124 A * | 11/1976 | Schrader ............. | E01C 19/4833 404/118 |
| 4,379,653 A | 4/1983 | Brown | |
| 4,702,642 A * | 10/1987 | Musil .................... | E01C 19/405 404/118 |
| 5,190,396 A * | 3/1993 | Aoyagi ................. | E01C 19/006 404/119 |
| 5,647,688 A | 7/1997 | Guntert et al. | |
| 5,924,819 A * | 7/1999 | Breidenbach ........... | E01C 19/42 404/104 |
| 6,890,125 B1 * | 5/2005 | Calder .................... | E01C 19/42 404/104 |
| 7,413,377 B2 * | 8/2008 | Pontano, III ........... | E01C 19/48 404/101 |
| 7,651,295 B2 * | 1/2010 | Eppes .................... | E01C 19/48 404/101 |
| 7,950,874 B2 | 5/2011 | Guntert, Jr. et al. | |
| 8,128,214 B2 | 3/2012 | Buschmann et al. | |
| 8,128,314 B2 * | 3/2012 | Buschmann ............. | E01C 19/48 404/104 |
| 8,221,026 B2 | 7/2012 | Munz et al. | |
| 8,864,410 B1 * | 10/2014 | Kopacz ................... | E01C 19/48 404/118 |
| 9,447,552 B2 * | 9/2016 | Buschmann ............ | E01C 19/42 |

(Continued)

FOREIGN PATENT DOCUMENTS

| CN | 1264773 | 8/2000 |
|---|---|---|
| CN | 103993545 | 8/2014 |

(Continued)

*Primary Examiner* — Thomas B Will
*Assistant Examiner* — Katherine J Chu

(57) ABSTRACT

A paver extension bracket device automates extension and retraction of a paver platform extension to correspond to and be driven by extension and retraction of a pre-existing laterally extendable paver mechanism. The device includes a bracket configured for coupling to a laterally extending paver mechanism of a paver. A post is coupled to and extends from the bracket such that said post is configured for coupling to a paver platform extension such that the paver platform extension is extended and retracted respectively by extension and retraction of the paver mechanism.

10 Claims, 3 Drawing Sheets

(56) References Cited

U.S. PATENT DOCUMENTS

| | | | | |
|---|---|---|---|---|
| 9,777,445 B1* | 10/2017 | Engel | ............... | E01C 19/48 |
| 2008/0131204 A1* | 6/2008 | Pontano | ............... | E01C 19/48 |
| | | | | 404/83 |
| 2012/0288328 A1* | 11/2012 | Minich | ............... | E01C 23/07 |
| | | | | 404/72 |
| 2015/0354149 A1 | 12/2015 | Dahm et al. | | |

FOREIGN PATENT DOCUMENTS

| | | |
|---|---|---|
| CN | 203846378 | 9/2014 |
| DE | 19707683 | 9/1998 |

* cited by examiner

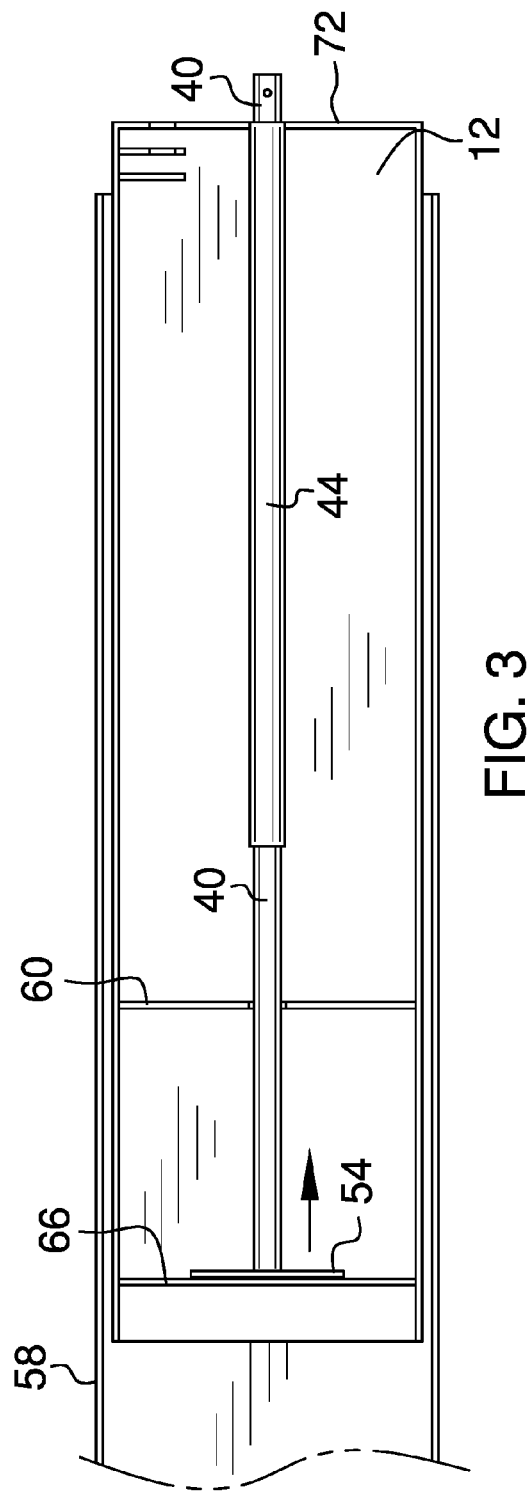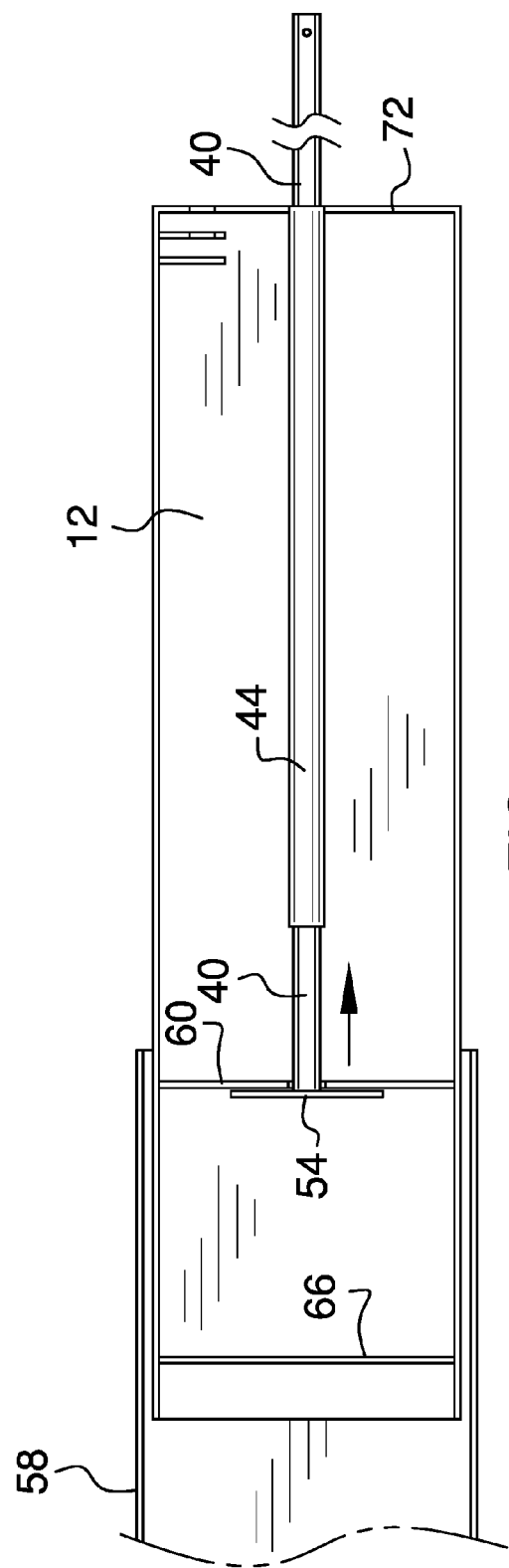

PAVER EXTENSION BRACKET DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to bracket devices and more particularly pertains to a new bracket device for automating extension and retraction of a paver platform extension to correspond to and be driven by extension and retraction of a pre-existing laterally extendable paver mechanism.

BRIEF SUMMARY OF THE INVENTION

An embodiment of the disclosure meets the needs presented above by generally comprising a bracket configured for coupling to a laterally extending paver mechanism of a paver. A post is coupled to and extends from the bracket such that said post is configured for coupling to a paver platform extension such that the paver platform extension is extended and retracted respectively by extension and retraction of the paver mechanism.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a bottom view of an embodiment of the disclosure in a fully retracted position.

FIG. 4 is a bottom view of an embodiment of the disclosure in a fully extended position.

DETAILED DESCRIPTION OF THE INVENTION

Figure 1:
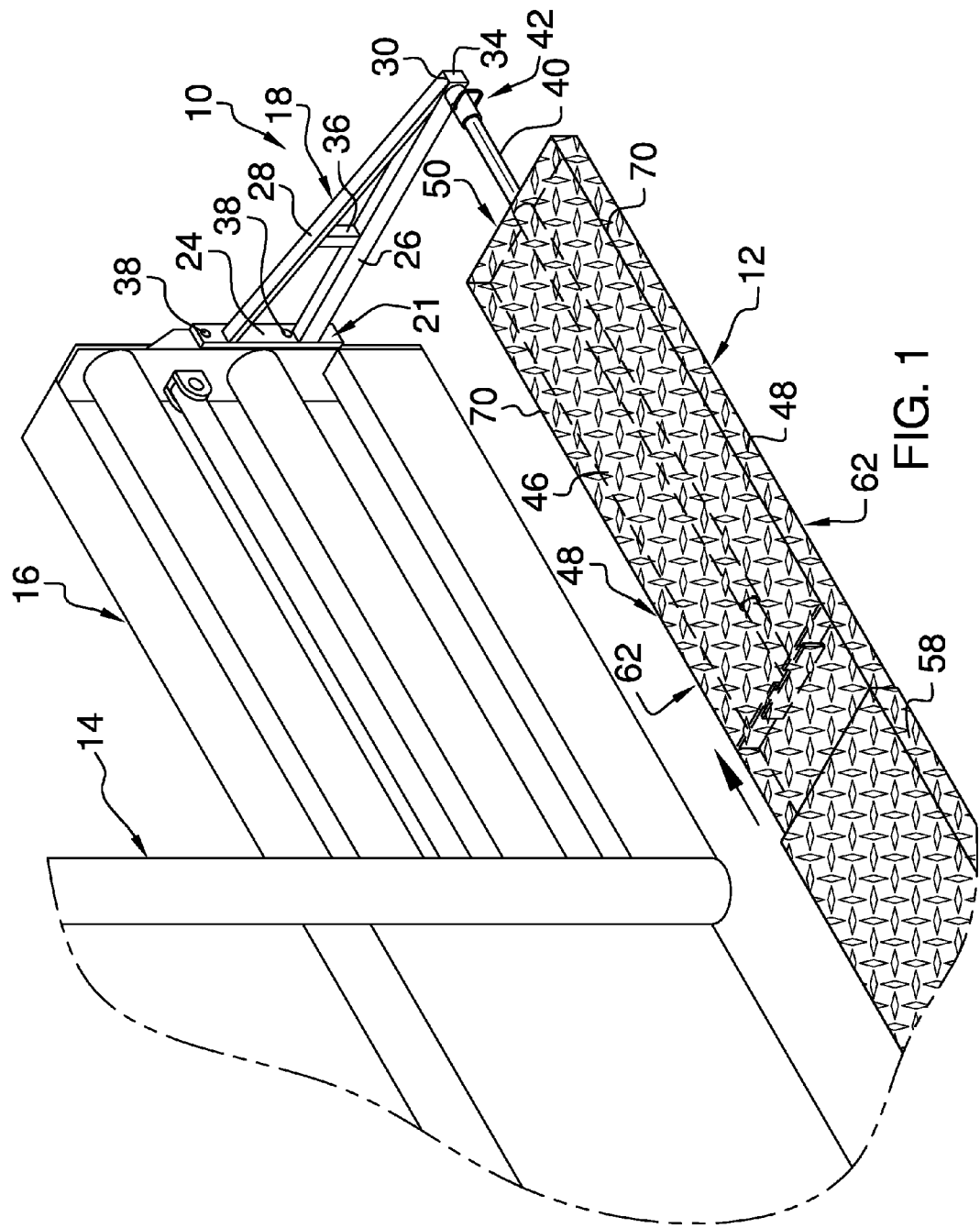
FIG. 1 is a top front perspective view of a paver extension bracket device according to an embodiment of the disclosure.
Figure 2:
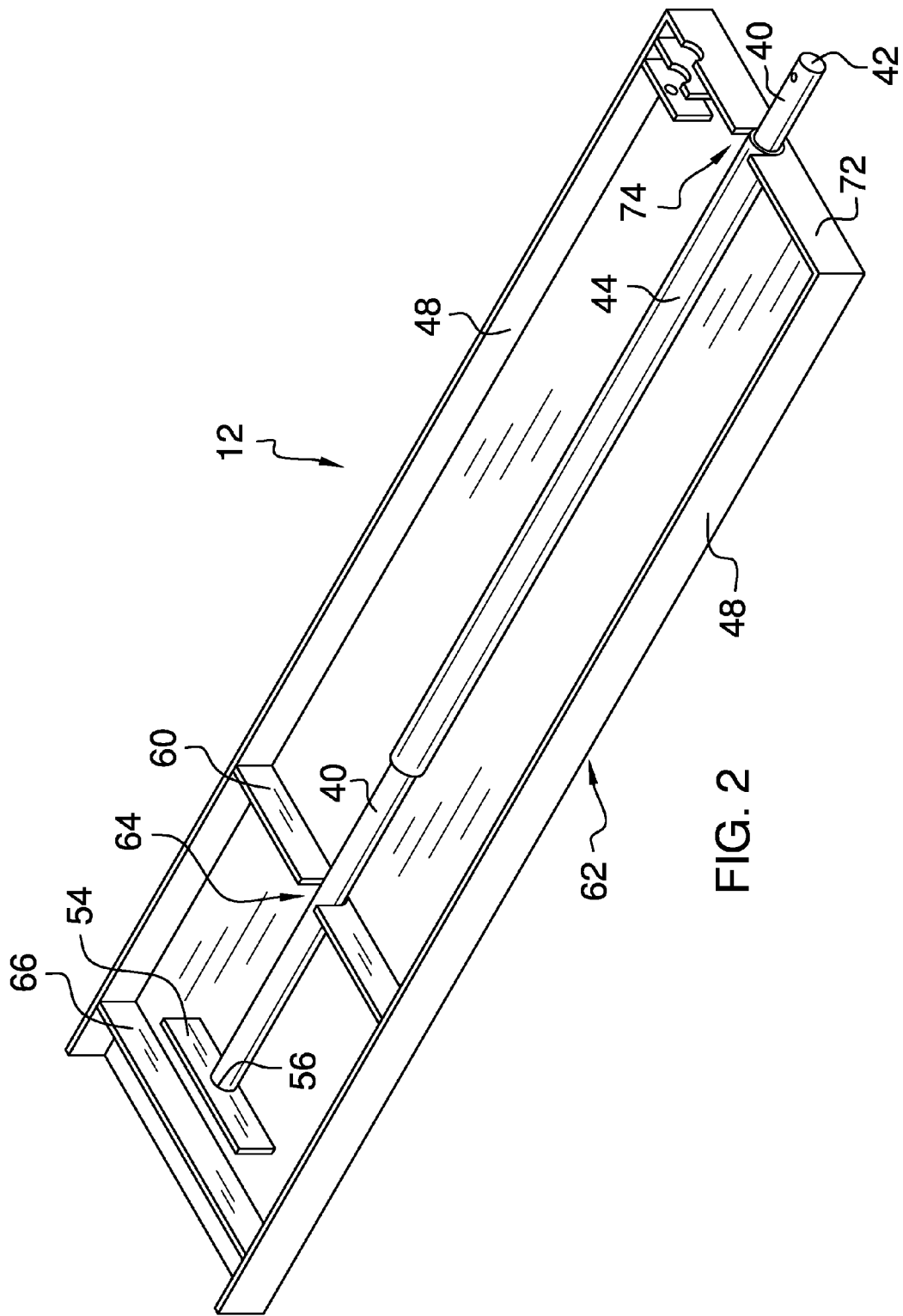
FIG. 2 is a bottom view of an embodiment of the disclosure.

With reference now to the drawings, and in particular to FIGS. 1 through 4 thereof, a new bracket device embodying the principles and concepts of an embodiment of the disclosure and generally designated by the reference numeral 10 will be described.

As best illustrated in FIGS. 1 through 4, the paver extension bracket device 10 generally provides for a platform extension 12 of a paver 14 to be automatically extended laterally relative to the paver 14 when a laterally extendable paver mechanism 16 of the paver 14 is extended. The paver mechanism 16 is of conventional design and a pre-existing element of the paver 14. A bracket 18 has a first end 20 configured for being coupled to a laterally extendable paver mechanism 16 of the paver 14. The laterally extendable paver mechanism 16 is of a conventional design and part of a conventional pre-existing paver 14. The bracket 18 has a base 24, a lower arm 26 extending from the base 24, and an upper arm 28 extending from the base 24. The lower arm 26 is perpendicular to the base 24. A distal end 30 of the upper arm 28 relative to the base 24 is coupled to a distal end 34 of the lower arm 26 relative to the base 24. The upper arm 26 is straight such that the bracket is right triangle shaped and planar. The planar design of the bracket 24 allows the bracket to be coupled to the laterally extendable paver mechanism 16 extending rearwardly parallel to a line of travel of the paver 14. Thus, the bracket 18 is positioned close to an outer lateral edge of the paver 14 and does not substantially increase the overall width of the paver 14 when attached. The bracket 18 may include a medial support 36 coupled to and extending between the lower arm 26 and the upper arm 28. The base 24 has a pair of spaced mounting holes 38 extending therethrough wherein the base 24 is configured for being secured to the laterally extendable paver mechanism 16 in a conventional manner using bolts or the like.

A post 40 has a first end 42 coupled to the bracket 18 proximate a junction of the upper arm 28 and the lower arm 26. A collar 44 is coupled to the platform extension 12. The platform extension 12 has a substantially planar top surface 46 and a pair of longitudinal flanges 48 extending downwardly from a peripheral edge 70 of the top surface 46. The collar 44 is centrally positioned along a short side 50 of the platform extension 12. If an end brace 72 is extending between the longitudinal flanges 48 then a break 74 is aligned with collar 44. The post 40 extends through the collar 44 such that the post 40 is slidable within the collar 44.

The collar 44 may be elongated to facilitate alignment of the post 40 relative to the platform extension 12. A plate 54 is coupled to a second end 56 of the post 40. The plate 54 engages the platform extension 12 as the post 40 is moved generally with the bracket 18 such that the platform extension 12 is configured for being extended and retracted relative to a fixed platform 58 coupled to the paver 14 by extension and retraction of the laterally extendable paver mechanism 16.

Typically, the extendable length of the platform extension 12 is less than the length of extension of the laterally extendable paver mechanism 16. A medial brace 60 is coupled to and extends between longitudinal sides 62 of the platform extension 12. The medial brace 60 may be fixed to the longitudinal flanges 48 and/or an underside of the planar top 46. The medial brace 60 has a gap 64 therein aligned with the collar 44. The post 40 extends through the gap 64. The plate 54 is positioned between the medial brace 60 and an outer brace 66 of the platform extension 12. A distance between the medial brace 60 and the outer brace 66 is equivalent to the difference in extension lengths of the platform extension 12 and the laterally extendable paver mechanism 16. Thus, the platform extension 12 is extended from the fixed platform 58 of the paver 14 when the plate 54 abuts the medial brace 60 to urge the platform extension 12 outwardly from the fixed platform 58. The plate 54 abuts the outer brace 66 of the platform extension 12 to urge the platform extension 12 inwardly to the fixed platform 58.

In use, the bracket 18 and post 40 may be installed on a pre-existing paver 14 or provided as part of the original manufacture of the paver 14. When added to an existing paver, as the platform extension 12 is typically a pre-existing component of the paver 14, the medial brace 60 is added to the platform extension 12 at the desired position to create lag in the movement of the platform extension 12 relative to the laterally extendable paver mechanism 16. The device 10 thus automates extension and retraction of the platform extension 12 corresponding to extension and retraction of the laterally extendable paver mechanism 16. Guides such as rails and stops, or the like, conventionally used and provided with a pre-existing platform extension are not shown.

With respect to the above description, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A paver extension bracket device comprising:
    a platform extension configured for being extendably coupled to a paver;
    a bracket having a first end configured for being coupled to a laterally extendable paver mechanism of the paver;
    a post having a first end coupled to said bracket;
    a collar coupled to said platform extension, said post extending through said collar such that said post is slidable within said collar;
    a plate coupled to a second end of said post, said plate engaging said platform extension wherein said platform extension is configured for being extended and retracted relative to a platform coupled to the paver by extension and retraction of the paver mechanism.

2. The device of claim 1, further comprising a medial brace coupled to and extending between longitudinal sides of said platform extension, said medial brace having a gap therein, said post extending through said gap, said plate being positioned between said medial brace and an outer brace of said platform extension, said platform extension being extended from the platform of the paver when said plate abuts said medial brace to urge said platform extension outwardly from the platform.

3. The device of claim 2, further comprising said plate abutting said outer brace of said platform extension to urge said platform extension inwardly to the platform.

4. The device of claim 1, further comprising said bracket having a base, a lower arm extending from said base, and an upper arm extending from said base, a distal end of said upper arm relative to said base being coupled to a distal end of said lower arm relative to said base.

5. The device of claim 4, further comprising said lower arm being perpendicular to said base.

6. The device of claim 5, further comprising said upper arm being straight wherein said bracket is right triangle shaped.

7. The device of claim 4, further comprising said bracket being planar.

8. The device of claim 4, further comprising said base having a pair of spaced mounting holes extending therethrough wherein said base is configured for being secured to the laterally extendable paver mechanism.

9. The device of claim 4, further comprising a medial support coupled to and extending between said lower arm and said upper arm.

10. A paver extension bracket device comprising:
    a platform extension configured for being extendably coupled to a paver;
    a bracket having a first end configured for being coupled to a laterally extendable paver mechanism of the paver, said bracket having a base, a lower arm extending from said base, and an upper arm extending from said base, said lower arm being perpendicular to said base, a distal end of said upper arm relative to said base being coupled to a distal end of said lower arm relative to said base, said upper arm being straight wherein said bracket is right triangle shaped and planar, said bracket including a medial support coupled to and extending between said lower arm and said upper arm, said base having a pair of spaced mounting holes extending therethrough wherein said base is configured for being secured to the laterally extendable paver mechanism;
    a post having a first end coupled to said bracket proximate a junction of said upper arm and said lower arm;

a collar coupled to said platform extension, said post extending through said collar such that said post is slidable within said collar;

a plate coupled to a second end of said post, said plate engaging said platform extension wherein said platform extension is configured for being extended and retracted relative to a platform coupled to the paver by extension and retraction of the paver mechanism;

a medial brace coupled to and extending between longitudinal sides of said platform extension, said medial brace having a gap therein, said post extending through said gap, said plate being positioned between said medial brace and an outer brace of said platform extension, said platform extension being extended from the platform of the paver when said plate abuts said medial brace to urge said platform extension outwardly from the platform, said plate abutting said outer brace of said platform extension to urge said platform extension inwardly to the platform.

* * * * *